May 8, 1962 W. J. EVERS 3,033,164
ANIMAL FEEDING APPARATUS
Filed July 27, 1959

INVENTOR.
WILLIAM J. EVERS
BY Andrus & Starke
Attorneys

United States Patent Office 3,033,164
Patented May 8, 1962

3,033,164
ANIMAL FEEDING APPARATUS
William J. Evers, Kankakee, Ill., assignor to A. O. Smith Corporation, Milwaukee, Wis., a corporation of New York
Filed July 27, 1959, Ser. No. 829,575
8 Claims. (Cl. 119—54)

This invention relates to an animal feeding apparatus and more particularly to a mechanism for automatically dispensing feed to an animal from a bulk storage container and for preventing air from contacting the feed during the dispensing operation.

In a typical animal feeding device, the feed is contained in a hopper and is dispensed from the hopper to a feed trough by a dispensing mechanism. The dispensing mechanism, in many cases, is operated by action of the animal opening the cover on the feed trough. When the feed is dispensed, either by the animal itself or by other means, air from the atmosphere contacts the bulk feed in the container or hopper and the oxygen in the air tends to decompose the same and cause spoilage. Spoilage of the feed due to contamination with air is not only a loss of the feed, but increases the handling in that the spoiled feed will not be eaten by the animal and has to be removed and dumped by the operator.

The present invention is directed to an animal feeding apparatus which prevents air from contacting the bulk storage feed. According to the invention, a hopper is located above the feed trough and a paddle or impeller is located in a cylindrical housing which has an inlet communicating with the hopper and an outlet communicating with the trough. Rotation of the blades of the impeller serves to conduct feed from the hopper and deposit the same within the trough.

The impeller blades are rotated by action of the animal lifting the cover on the feed trough. Lifting the cover operates through a pawl and ratchet mechanism to rotate the impeller blades a given increment and deposit a quantity of feed into the feed trough.

The impeller blades are disposed in sealing engagement with the cylindrical housing and define a series of closed chambers with the housing. An evacuating mechanism communicates with the housing and is located between the housing outlet and inlet in the direction of the impeller blade rotation. The evacuating mechanism serves to evacuate each chamber as the same is rotated to the location of said mechanism. By successively evacuating the chambers, air is prevented from contacting the feed material when the evacuated chamber is rotated to a position in communication with the hopper.

The present apparatus automatically dispenses a given quantity of feed to the feed trough and prevents air from contacting the feed within the hopper. Both the dispensing of the feed and the evacuation of the air within the chambers are operated by the animal itself so that the device requires no outside power source.

Other obejcts and advantages will appear in the course of the following description.

The drawings illustrate the best mode presently contemplated of carrying out the invention.

Figure 1:
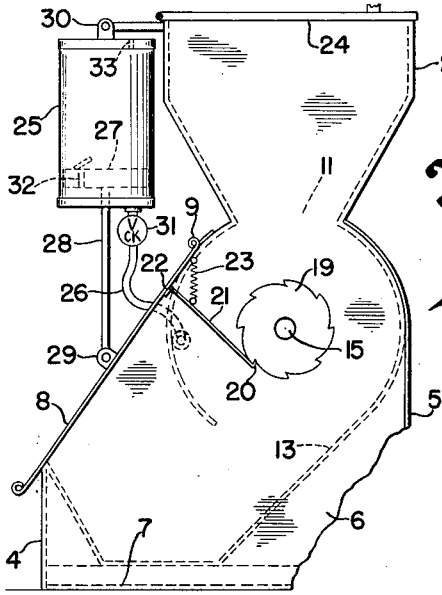
FIGURE 1 is an end view with parts broken away of the feeding device of the invention.
Figure 2:
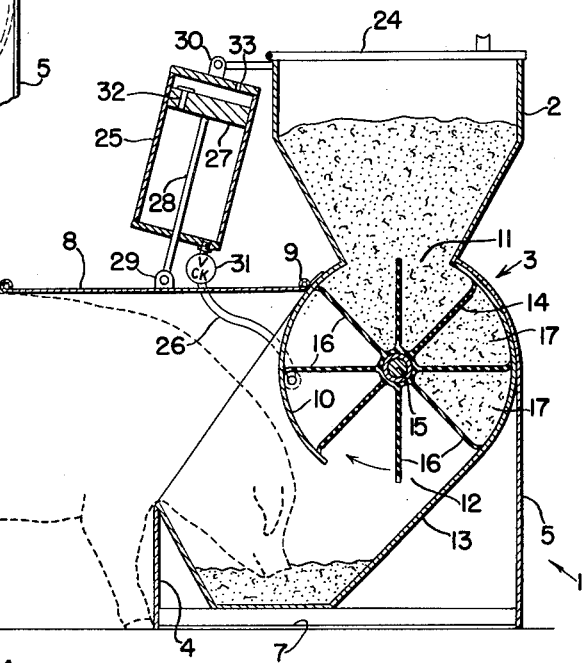
FIG. 2 is a vertical section of the feeding apparatus with the trough cover shown in the raised position.
Figure 3:
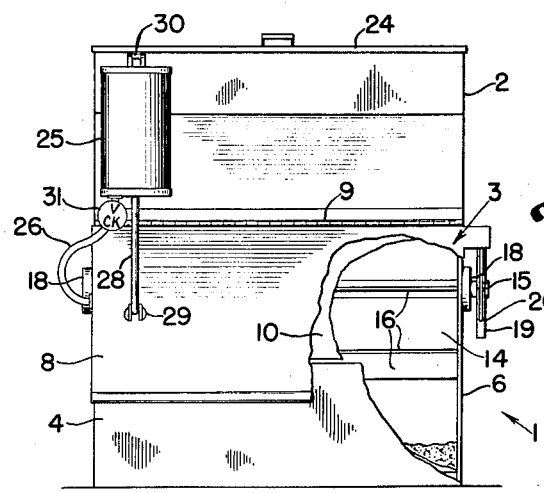
FIG. 3 is a front view of the feeding apparatus with parts broken away in section.

The drawings illustrate an animal feeding apparatus which includes a feeding trough 1 from which the animal is adapted to eat the feed, a hopper 2 containing a bulk supply of the feed and a dispensing mechanism 3 which automatically dispenses the feed from the hopper to the feed trough 1.

The feed trough 1 comprises a front wall 4 and a back wall 5 which are connected by side walls 6 and a bottom 7. A cover 8 encloses the front of the feed trough and is pivotally connected to the hopper 2 by hinges 9. The lower edge of the cover 8 projects downwardly beyond the front wall 4 so that the animal may lift the cover 8 upwardly with its nose.

The dispensing mechanism comprises a generally cylindrical drum 10 and the ends of the drum 10 are enclosed by the side walls 6 of the feed trough. The drum 10 is provided with an inlet 11 which communicates with the hopper 2 and an outlet 12 in the lower portion thereof which communicates with the feed trough. A baffle plate 13 is disposed within the trough beneath the drum 10 and serves to deflect the feed being discharged from the outlet 12 to the forward portion of the trough.

An impeller 14 is secured to a shaft 15 which is rotatably mounted within the drum 10. The impeller 14 includes a series of radial blades 16 which are secured to the shaft and rotate therewith. The blades 16 are fabricated from a generally flexible material and are disposed in sealing engagement with the periphery of the drum 10 and with the side walls 6 of the feed trough. The blades 16, in combination with the inner surface of the drum 10 and the side walls 6, define a series of sealed chambers 17 or compartments which receive the feed material and discharge the same to the feed trough.

The blades 16 can be composed of a resilient, flexible material, such as rubber, plastic or the like, or alternately, the blades may be fabricated from metal and provided with flexible tips which engage the drum 10 and side walls 6 in sealing engagement.

The shaft 15 is journaled within a pair of bearings 18 which are secured to the side walls 6.

The impeller 14 is rotated within the drum 10 by a pawl and ratchet mechanism which includes a ratchet 19 which is secured to the outer end of shaft 15. The ratchet is adapted to be engaged and rotated by a pawl 20 secured to the end of a rod 21. The other end of the rod 21 is secured to a tab 22 which projects outwardly from the cover 8. The pawl 20 is urged upwardly into engagement with the teeth of ratchet 19 by a spring 23. With this construction, upward pivotal movement of the cover by the animal will move the pawl 20 and rotate the ratchet one increment to thereby rotate the impeller 14. Rotation of the impeller will bring the next succeeding chamber 17 into communication with the hopper 2 and the feed will thereby flow from the hopper into this chamber. Correspondingly, the rotation of the impeller will move one of the lower chambers into communication with the outlet 12 and thereby discharge the feed contained in that chamber to the feed trough.

Even though the hopper 2 is a substantially closed unit, having a cover 24, the air within the chambers 17 moving into communication with the hopper will contaminate the feed within the hopper and cause spoilage of the same. This spoilage may amount to a substantial proportion of the total feed and therefore, it is important to prevent the air from contacting the feed within the hopper 2. In accordance with the present invention, an evacuating mechanism is operably connected to the cylindrical drum 10 and serves to evacuate the chambers 17 before they are moved into communication with the hopper 2. The evacuating mechanism includes a cylinder 25 which communicates by means of conduit 26 with the cylindrical drum 10 at a location between the outlet 12 and the inlet 11, in the direction of rotation of the impeller 14, so that the chamber 17 communicating with the conduit 26 will be empty of feed at this time.

A piston 27 is slidably disposed within the cylinder 25 and carries a rod 28 which extends downwardly through the lower end of the cylinder and is pivotally attached to cover 8, as indicated by 29. The upper end of the cylinder is pivotally connected to a support 30 extending outwardly from hopper 2. The conduit 24 is provided with a suitable check valve 31 which permits the flow of air from the drum 10 to the cylinder 25 but prevents the flow of air in the opposite direction. Similarly, the piston 27 is provided with a suitable opening which houses a check valve 32. Check valve 32 permits the flow of air from the lower end of the cylinder to the upper end thereof as the piston is moved downwardly within the cylinder and prevents movement of the air in the opposite direction. The upper end of the cylinder is provided with a suitable vent opening 33.

When the animal lifts the cover 8, the upward movement of the cover will move the piston 27 upwardly within cylinder 25 and evacuate the chamber 17 disposed in communication with the conduit 26. When the cover is pivoted downwardly at the completion of the animal's feeding, the piston 27 will move downwardly within the cylinder and the air within the cylinder will pass through check valve 32 to the atmosphere.

As the cover is again lifted by virtue of another animal desiring feed, the impeller 14 will be rotated to dispose the next succeeding chamber 17 in communication with the conduit 26 and this chamber will then be evacuated in the same manner. With this construction, the chambers 17, moving into communication with the hopper 2, will be substantially evacuated and free of air. This will prevent the feed within the hopper from being contaminated or spoiled by virtue of contact with the outside atmosphere and insures that all of the feed will be available to the animals.

The present invention provides an apparatus for automatically dispensing metered quantities of feed to an animal and also preventing contamination of the feed within the bulk container by the atmosphere. This substantially reduces the spoilage of the feed and also decreases the handling which is necessary in order to manually remove the spoiled feed from the feed trough. Both the dispensing and the evacuating mechanisms are actuated by the animal itself so that no outside power source is required.

Various modes of carrying out the invention are contemplated as being within the scope of the following claims particularly pointing out and distinctly claiming the subject matter which is regarded as the invention.

I claim:

1. An animal feeding apparatus, comprising a bulk storage container, a feed trough, conduit means providing communication between the bulk storage container and the feed trough, feed conveying means disposed within said conduit means and including a series of movable members disposed in sealing engagement with the walls of said conduit means and defining a series of sealed compartments with the walls of said conduit means, means for progressively moving each compartment in a direction from a first position in communication with said container to a second position in communication with the trough and back to said first position to thereby conduct feed from said container to said trough, and evacuating means communicating with said conduit means at a location between said second position and said first position in the direction of movement of said compartments whereby each compartment is successively evacuated after said compartment leaves said second position and before said compartment reaches said first position to thereby prevent air from contaminating the feed when said compartment is moved to said first position.

2. An animal feeding apparatus, comprising a bulk storage container, a feed trough, conduit means providing communication between the bulk storage container and the feed trough and including a generally cylindrical chamber, an impeller rotatably disposed within said chamber and having a series of blades disposed in sealing engagement with the walls of said chamber and defining a series of zones with said walls, means for rotating the impeller to progressively move each zone from a first position in communication with said container to a second position in communication with said trough to thereby conduct feed from said container to the trough, and evacuating means operably connected to said last named means and communicating with the chamber at a location between said second position and said first position in the direction of impeller rotation, said evacuating means serving to evacuate the air from the zone disposed in communication with said evacuating means as the impeller is rotated to thereby prevent air from contaminating the feed when said zone is rotated to said first position in communication with said container.

3. An animal feeding apparatus, comprising a bulk storage container, a feed trough disposed below said bulk storage container and including a movable element adapted to be moved by an animal desiring feed, conduit means communicating between said container and said feed trough and having an inlet disposed in communication with said container and an outlet disposed in communication with said trough, an impeller rotatably disposed within said conduit means and having a series of blades disposed in sealing engagement with the walls of the conduit means to thereby define a series of sealed compartments, means actuated by movement of said element for rotating the impeller and thereby progressively moving each of said compartments from a position in communication with said inlet to a position in communication with said outlet to thereby conduct feed from said container to the trough, and evacuating means operably connected to said movable element and disposed in communication with said conduit means and disposed at a location between said outlet and inlet in the direction of impeller rotation, said evacuating means serving to evacuate the air from the compartment disposed in communication therewith and thereby preventing air from contaminating the feed when said compartment is rotated to a position in communication with said container.

4. An animal feeding apparatus, comprising a bulk storage container, a feed trough disposed below said bulk storage container and including a movable cover, conduit means communicating between said container and said feed trough and having an inlet disposed in communication with said container and an outlet disposed in communication with said trough, an impeller rotatably disposed within said conduit means and having a series of blades disposed in sealing engagement with the walls of the conduit means to thereby define a series of sealed compartments, means actuated by movement of said cover for rotating the impeller and thereby progressively moving each of said compartments from a position in communication with said inlet to a position in communication with said outlet to thereby conduct feed from said container to the trough, evacuating means disposed in communication with said conduit means and disposed at a location between said outlet and inlet in the direction of impeller rotation, and means operably connecting said cover and said evacuating means and actuated by movement of the cover for operating said evacuating means to evacuate the air from the compartment disposed in communication therewith and thereby preventing air from contaminating the feed when said compartment is rotated to a position in communication with said container.

5. An animal feeding apparatus, comprising a bulk storage container, a feed trough disposed below said bulk storage container and including a movable cover, conduit means communicating between said container and said feed trough and having an inlet disposed in communication with said container and an outlet disposed in communication with said trough, feed conveying means disposed within said conduit means and including a plurality of movable members disposed in sealing engagement with the walls of said conduit means and defining a series of sealed compartments with the walls of said conduit means, means for progressively moving each compartment from a first position in communication with said container to a second position in communication with the trough and back to said first position to thereby conduct feed from said container to said trough, a cylinder member, evacuating conduit means connected to and providing communication between one end of said cylinder member and said first named conduit means at a location between said outlet and inlet in the direction of compartment movement, and a piston member slidably disposed within the cylinder member, one of said members being connected to said cover and the other of said members being connected to a fixed object, whereby movement of said cover by the animal effects relative movement between said piston member and cylinder member to thereby evacuate the compartment disposed in communication with the cylinder member and prevent air from contaminating the feed in the container when said compartment is subsequently moved into communication with the container.

6. An animal feeding apparatus, comprising a closed hopper to contain feed, a feed trough disposed below the hopper and including a hinged cover, a generally cylindrical drum having end walls and having a peripheral inlet opening disposed in communication with the lower end of the hopper and having a peripheral outlet opening disposed in communication with the trough, an impeller disposed within the drum and rotatable about a generally horizontal axis, said impeller having a plurality of blades disposed in sealing engagement with the peripheral surface and the end walls of the drum to provide a series of sealed compartments, means actuated by lifting of the cover for rotating said impeller and thereby progresively rotating each of said compartments from a position in communication with said inlet opening to a position in communication with said outlet opening to thereby conduct feed from said hopper to said trough, a cylinder member, evacuating conduit means connected to and providing communication between one end of said cylinder member and the interior of said drum at a location between said outlet opening and said inlet opening in the direction of impeller rotation, a piston member slidably disposed within the cylinder member, one of said members being connected to said cover and the other of said members being connected to a generally fixed object, and means actuated by lifting of said cover for moving said piston member relatively of said cylinder member to thereby evacuate the compartment disposed in communication with said conduit means and prevent air from contaminating the feed in the container when said compartment is subsequently rotated into communication with said inlet opening.

7. An animal feeding apparatus, comprising a closed hopper to contain feed, a feed trough disposed below the hopper and including a hinged cover, a generally cylindrical drum having end walls and having a peripheral inlet opening disposed in communication with the lower end of the hopper and having a peripheral outlet opening disposed in communication with the trough, an impeller disposed within the drum and rotatable about a generally horizontal axis, said impeller having a plurality of blades disposed in sealing engagement with the peripheral surface and the end walls of the drum to provide a series of sealed compartments, means actuated by lifting of the cover for rotating said impeller and thereby progressively rotating each of said compartments from a position in communication with said inlet opening to a position in communication with said outlet opening to thereby conduct feed from said hopper to said trough, evacuating means disposed in communication with said drum at a peripheral location between the outlet opening and said inlet opening in the direction of impeller rotation, and means actuated by lifting of said cover for operating said evacuating means to thereby evacuate the compartment disposed in communication with said evacuating means and prevent air from contaminating the feed in the container when said compartment is subsequently rotated into communication with said inlet opening.

8. The structure of claim 6, and including check valve means disposed in said conduit means for permitting flow of air from said drum to said cylinder and preventing flow of air in the opposite direction.

References Cited in the file of this patent

UNITED STATES PATENTS

| | | |
|---|---|---|
| 1,285,348 | Page | Nov. 19, 1918 |
| 1,358,525 | Cottrel | Nov. 9, 1920 |
| 2,062,438 | Baker | Dec. 1, 1936 |
| 2,084,764 | Constantin | June 22, 1937 |
| 2,234,041 | Chandler | Mar. 4, 1941 |
| 2,765,742 | King | Oct. 9, 1956 |